United States Patent
Dayananda S

(10) Patent No.: US 12,339,644 B2
(45) Date of Patent: Jun. 24, 2025

(54) VIRTUAL MANUFACTURING USING VIRTUAL BUILD AND ANALYSIS TOOLS

(71) Applicant: Applied Materials, Inc., Santa Clara, CA (US)

(72) Inventor: Pradeep Dayananda S, Bengaluru (IN)

(73) Assignee: Applied Materials, Inc., Santa Clara, CA (US)

( * ) Notice: Subject to any disclaimer, the term of this patent is extended or adjusted under 35 U.S.C. 154(b) by 280 days.

(21) Appl. No.: 17/374,873

(22) Filed: Jul. 13, 2021

(65) Prior Publication Data

US 2023/0019912 A1    Jan. 19, 2023

(51) Int. Cl.
  *G05B 19/4099*    (2006.01)
  *G06F 30/13*      (2020.01)
  *G06T 19/20*      (2011.01)

(52) U.S. Cl.
  CPC ......... *G05B 19/4099* (2013.01); *G06F 30/13* (2020.01); *G06T 19/20* (2013.01); *G05B 2219/49007* (2013.01); *G06T 2219/004* (2013.01); *G06T 2219/2008* (2013.01)

(58) Field of Classification Search
  CPC ...... G05B 19/4099; G05B 2219/49007; G06F 30/13; G06T 19/20; G06T 2219/004; G06T 2219/2008
  USPC ...................... 700/98, 95, 116, 108; 434/365
  See application file for complete search history.

(56) References Cited

U.S. PATENT DOCUMENTS

| | | | | |
|---|---|---|---|---|
| 10,657,313 | B2 * | 5/2020 | Marchsreiter | G06F 40/166 |
| 2002/0123812 | A1 * | 9/2002 | Jayaram | G06T 19/20 |
| | | | | 345/475 |
| 2014/0282545 | A1 * | 9/2014 | Richards | G06F 9/5072 |
| | | | | 718/1 |
| 2016/0078156 | A1 * | 3/2016 | Wiening | G06F 30/20 |
| | | | | 703/1 |
| 2017/0309067 | A1 * | 10/2017 | Nakamura | G06F 3/0428 |
| 2018/0277015 | A1 * | 9/2018 | Casella | G06F 18/00 |
| 2019/0266804 | A1 * | 8/2019 | Kohlhoff | G06T 13/20 |

FOREIGN PATENT DOCUMENTS

| | | | |
|---|---|---|---|
| CN | 109636117 A | * | 4/2019 |
| JP | 2012014569 A | * | 1/2012 |

* cited by examiner

*Primary Examiner* — Thomas C Lee
*Assistant Examiner* — Michael Tang
(74) *Attorney, Agent, or Firm* — Kilpatrick Townsend & Stockton LLP

(57) ABSTRACT

A virtual build of an assembly may be performed by operating a virtual build tool inside of an active session of design software that is configured to design an assembly having multiple individual parts; importing characteristics of the assembly from a three-dimensional (3D) model of the assembly that is maintained by the design software; receiving an input of sequence numbers that indicate an assembly order for the individual parts; generating images for the individual parts as they are incrementally added to the assembly based on the sequence numbers; and generating a set of build instructions based on the sequence numbers and the images for the individual parts, where the set of build instructions illustrate how to physically manufacture the assembly.

17 Claims, 13 Drawing Sheets

VIRTUAL MANUFACTURING USING VIRTUAL BUILD AND ANALYSIS TOOLS

TECHNICAL FIELD

This disclosure generally relates to a virtual build tool for analyzing and performing a virtual build of an assembly. More specifically, this disclosure describes a tool that operates within a design software package to generate a set of build instructions based on sequence numbers and images generated or assigned during a virtual build process.

BACKGROUND

The traditional manufacturing process may be subdivided into two different stages. First, the design phase takes place largely in a computerized environment using three-dimensional (3D) computer-aided design (CAD) tools to design assemblies. Each part of the assembly may be represented by 3D objects in the design software, and may construct the overall assembly for the assembly. Thus, the output of the design phase is typically a full 3D representation of the assembly. The second phase of the manufacturing process may include the physical manufacturing of the assembly. The individual parts for each of the subassemblies are procured and physically assembled by human workers or machines. This is often be the first time that problems in the assembly, fit, and compatibility of the various parts and subassemblies are discovered. Additionally, physical manufacturing often requires extensive assembly manuals that are developed through manual processes that were not specifically linked to the design environment.

SUMMARY

In some embodiments, a method of performing a virtual build of an assembly may include operating a virtual build tool inside of an active session of design software, where the design software may be configured to design an assembly, and the assembly may include of a plurality of individual parts. The method may also include importing, from the design software into the virtual build tool, characteristics of the assembly from a three-dimensional (3D) model of the assembly that is maintained by the design software. The method may additionally include receiving, by the virtual build tool, input comprising sequence numbers that indicate an assembly order for the plurality of individual parts. The method may further include generating, by the virtual build tool, images for the plurality of individual parts as they are incrementally added to the assembly based on the sequence numbers. The method may also include generating a set of build instructions based on the sequence numbers and the images for the plurality of individual parts, where the set of build instructions may illustrate how to physically manufacture the assembly.

In some embodiments, a non-transitory computer-readable medium may include instructions that, when executed by one or more processors, cause the one or more processors to perform operations including operating a virtual build tool inside of an active session of design software, where the design software may be configured to design an assembly, and the assembly may include of a plurality of individual parts. The operations may also include importing, from the design software into the virtual build tool, characteristics of the assembly from a three-dimensional (3D) model of the assembly that is maintained by the design software. The operations may additionally include receiving, by the virtual build tool, input comprising sequence numbers that indicate an assembly order for the plurality of individual parts. The operations may further include generating, by the virtual build tool, images for the plurality of individual parts as they are incrementally added to the assembly based on the sequence numbers. The operations may also include generating a set of build instructions based on the sequence numbers and the images for the plurality of individual parts, where the set of build instructions may illustrate how to physically manufacture the assembly.

In some embodiments, a system may include one or more processors and one or more memory devices comprising instructions that, when executed by the one or more processors, cause the one or more processors to perform operations including operating a virtual build tool inside of an active session of design software, where the design software may be configured to design an assembly, and the assembly may include of a plurality of individual parts. The operations may also include importing, from the design software into the virtual build tool, characteristics of the assembly from a three-dimensional (3D) model of the assembly that is maintained by the design software. The operations may additionally include receiving, by the virtual build tool, input comprising sequence numbers that indicate an assembly order for the plurality of individual parts. The operations may further include generating, by the virtual build tool, images for the plurality of individual parts as they are incrementally added to the assembly based on the sequence numbers. The operations may also include generating a set of build instructions based on the sequence numbers and the images for the plurality of individual parts, where the set of build instructions may illustrate how to physically manufacture the assembly.

In any embodiments, any and all of the following features may be implemented in any combination and without limitation. The virtual build tool may display a table listing the plurality of individual parts in the assembly, and selecting an individual part in the plurality of individual parts may generate a rendered view of the individual part in the virtual build tool from the 3D model in the design software. The assembly may include one or more subassemblies. Importing the characteristics of the assembly may cause the virtual build tool to receive a plurality of user identifiers associated with the virtual build of the assembly, where a number of the user identifiers may be determined based on a selected level of the virtual build. The characteristics of the assembly may include 3D models of the plurality of individual parts, part numbers for the plurality of individual parts, physical dimensions of the plurality of individual parts, and/or quantities for the plurality of individual parts. Generating the images for the plurality of individual parts as they are incrementally added to the assembly may include adding an image of a current individual part to a composite image comprising images of previous parts in an assembly sequence; and receiving one or more commands that may cause the image of the current individual part to be placed into the composite image to illustrate how the current individual part is added to the assembly when physically manufacturing the assembly. The method/operations may also include receiving a selection of a subset of the plurality of individual parts; determining whether volumes of the subset of the plurality of individual parts include overlapping volumes; and generating a list of interferences between the volumes of the subset of the plurality of individual parts.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Prior to this disclosure, the manufacturing process could be subdivided into two different stages. The design phase took place largely in a computerized environment using three-dimensional (3D), computer-aided design (CAD) tools to design assemblies. An assembly may be made up of a number of different subassemblies, and subassemblies may be comprised of individual parts. For example, a cabinet assembly may include subassemblies for doors, shelves, and other items that are part of the cabinet assembly. A subassembly for the door may include a panel, hinges, screws, a handle, etc. Each of these parts may be represented by 3D objects in the design software, and may be placed relative to each other to construct the overall assembly for the cabinet. Thus, the output of the design phase was typically a full 3D representation of the assembly, including subassemblies and individual parts.

The second phase of the manufacturing process would include the physical manufacturing of the assembly. The individual parts for each of the subassemblies would be procured and physically assembled by human workers or machines. This would often be the first time that problems in the assembly, fit, and/or compatibility of the various parts and subassemblies would be discovered. Additionally, physical manufacturing often required extensive assembly manuals to be developed through manual processes that were not specifically linked to the design environment.

Figure 1:
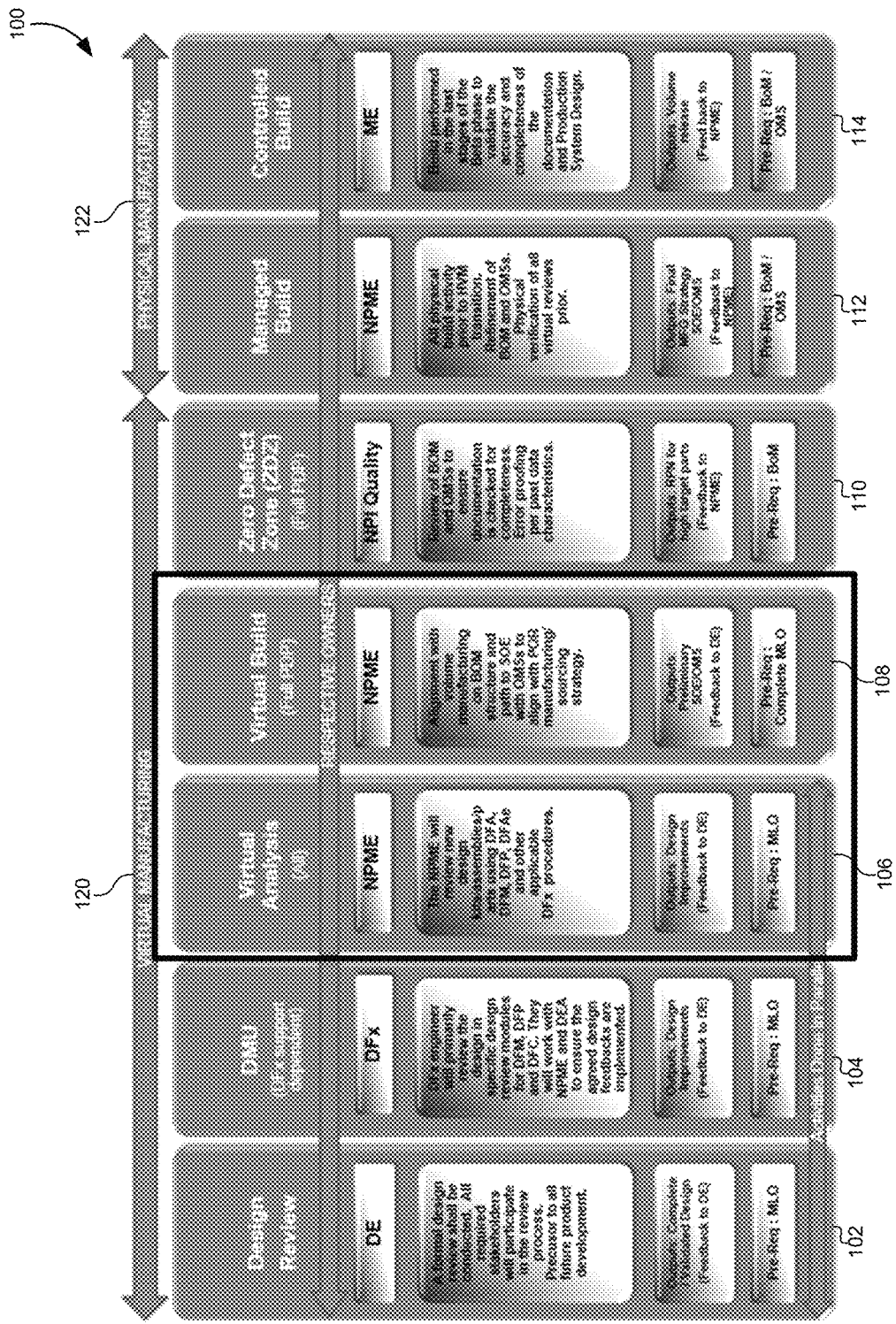
FIG. 1 illustrates a flow diagram of a virtual manufacturing process, according to some embodiments.

FIG. 1 illustrates a flow diagram 100 of a virtual manufacturing process 120, according to some embodiments. The virtual manufacturing process 120 may begin with a design review stage 102 that receives as an input the 3D design assembly. As discussed above, the 3D design may be developed using CAD tools and may include 3D models that are representations of each of the subassemblies and parts combined to form the overall assembly. The design review stage 102 include a formal design review to ensure that the assembly meets the predetermined specifications. The design review stage 102 may provide a complete/validated design file for the assembly. Any problems discovered during the design review stage 102 can provide feedback to the design engineer, and the design review stage 102 may be iterated until the design is complete/validated.

After the design has been completed/validated, a second review stage 104 may take place. The second review stage 104 may include a digital mockup (DMU) that is reviewed by "Design for" engineers who review the design for specific requirements. For example, these engineers may primarily review the design and specific models to meet different requirements. Design for Manufacturing (DFM) may review the design to ensure that it can be properly manufactured. Design for Aesthetics (DFAe) may review the design to ensure that it meets aesthetic requirements for form and appearance. Any problems discovered in the second review stage 102 may also be passed back to the design engineer (DE) such that design can be iterated and improved until all the requirements are met in each of the "Design for" review modules.

Note that the design review stage 120 may be part of an overall virtual manufacturing process 102 enabled by the embodiments described herein. The virtual manufacturing process 120 may include a number of different stages that take place using a virtual build tools that runs as a plug-in or application inside the design environment. As discussed below in FIG. 2, the virtual manufacturing process 120 may operate within the design software environment. This allows the virtual manufacturing process 120 to have access to the 3D design of the assembly, subassemblies, and individual parts. In some embodiments, a virtual analysis stage 106 may use a virtual analysis tool to determine whether special tooling, supports, or handling procedures are needed, along with performing a clearance analysis. The virtual analysis stage 106 may be executed in parallel with the design review stage 102 and the second review stage 104 to provide feedback to the design engineer such that the design of the assembly can be iterated until these requirements are met. In some embodiments, a virtual build stage 108 may also be executed by the tool to generate an issues report, a bill of materials (BOM), a sequence listing for assembly, a virtual build report, and other information described below. The operation of the software tool for the virtual analysis stage 106 and the virtual build stage 108 is described in detail in remainder of this disclosure.

After the virtual manufacturing process 120 is complete, the physical manufacturing process 122 may be executed. For example, a managed build stage 112 may refine the build instructions, manuals, BOM, etc., and a control build stage 114 may validate the accuracy and completeness of the documentation before sending the assembly into production.

Figure 2:
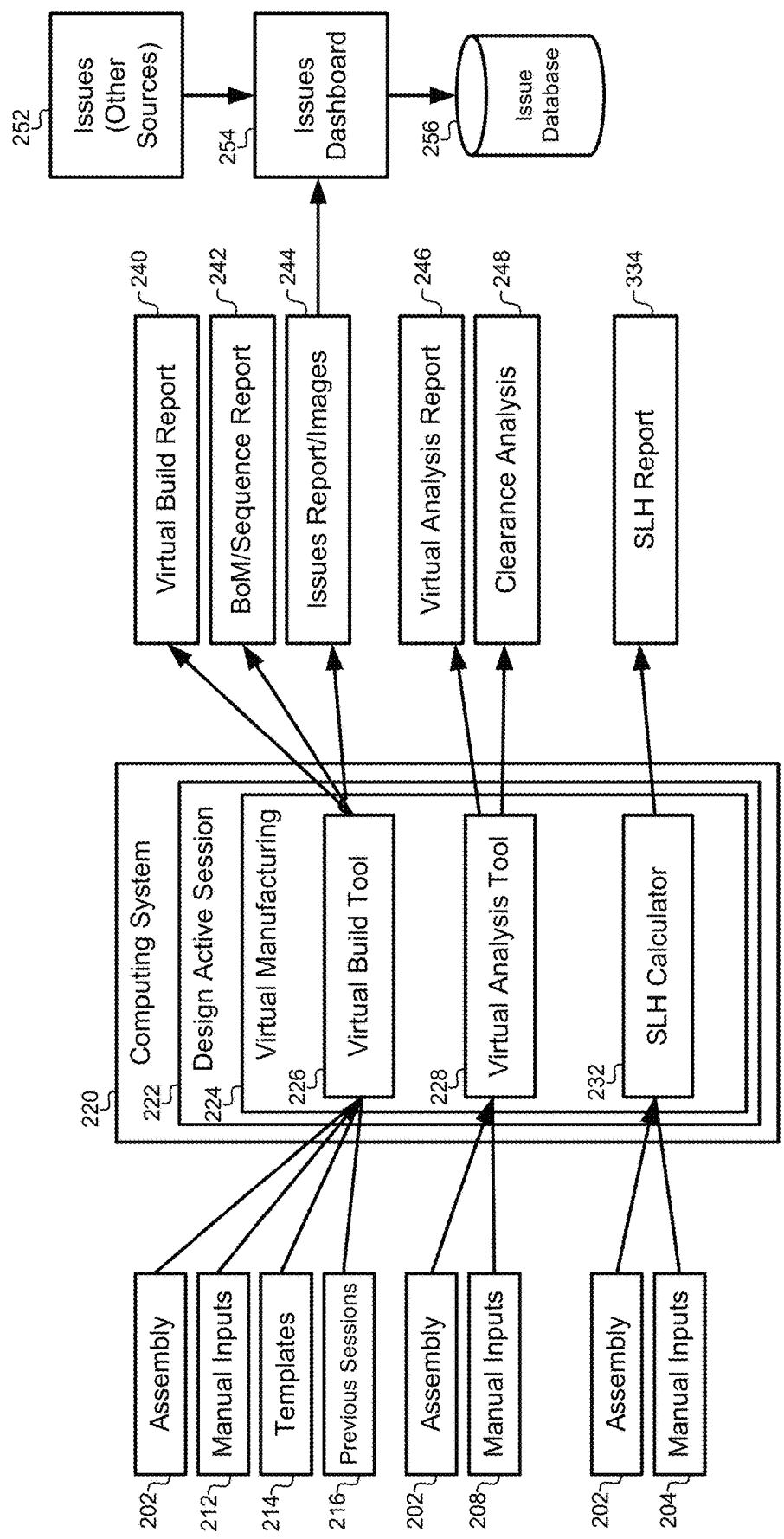
FIG. 2 illustrates a block diagram of how the virtual manufacturing process can be executed in an active session of the design environment, according to some embodiments.

FIG. 2 illustrates a block diagram of how the virtual manufacturing process can be executed in an active session of the design environment, according to some embodiments. A computing system 220 such as a server, blade server, cloud environment, on-premise data center, stand-alone workstation, and/or other computing environment may execute the design software 220 described above. The design software 220 may include 3D CAD tools, manufacturing software, and/or product lifecycle management software such as the Teamcenter® software package. The design software 220 may store and manage the 3D design of the assembly. The design software 220 may also provide visualization tools that allow for the viewing, manipulation, and editing of the 3D design of the assembly in a virtual environment.

Instead of using a separate software process, the virtual manufacturing tools 224 may execute within an active session of the design software 222. For example, the virtual manufacturing tools 224 may operate as a plug-in or application that runs within the design software 222. This allows the virtual manufacturing tools 224 to have access to the 3D design of the assembly and other utilities that may be provided by the design software 222. For example, as described below, the virtual manufacturing tools 222 may receive thumbnails or images of the different subassemblies that can be used to generate reports. The virtual manufacturing tool 224 may use the design software 222 to manipulate 3D images, crop images, select portions of an image, create cross-sections, and so forth. When the virtual manufacturing tool 224 is loaded, the virtual manufacturing tool 224 may load the 3D models by extracting each subassembly and/or individual part from the 3D design. As described below, the virtual manufacturing tool 224 may allow users to select individual parts or subassemblies and perform virtual manufacturing activities.

In some embodiments, the virtual manufacturing tool 224 may include a virtual build tool 226 that is configured to walk through a virtual build of the assembly. The virtual build tool 224 may import the 3D model of the assembly 202 from the design software 222, including names, parts, dimensions, colors, positions, orientations, and other details of each individual part. The virtual build tool 226 may also receive manual inputs 212 from a user to specify issues and/or a sequence of steps for physically assembling the overall assembly. The virtual build tool 226 may also load templates 224 that can be populated to generate a virtual build report 240, a BOM or sequence report 242, an issue report 244, and/or other outputs. These templates 214 may be populated with values that are calculated or provided to the virtual build tool 226 as described below. Additionally, the virtual build tool 226 may save progress in a spreadsheet or other data format between sessions. This allows the virtual build tool 226 to load data from previous sessions 216 to be used in a current active session of the design software 222.

Some embodiments may also include a virtual analysis tool 228 that is configured to perform an analysis and identify issues that may arise during the physical manufacturing of the assembly. The virtual analysis tool 228 may also load the assembly 202 from the design software 222 along with any manual inputs 208 from the user to perform a virtual analysis. The virtual analysis tool 228 may generate a virtual analysis report 246 that includes any special tooling, equipment, skills or other requirements that may need to be present during the physical assembly. The virtual analysis tool 228 may also generate a clearance analysis 248 that identifies any overlapping parts in the final assembly.

Some embodiments may also receive a Standard Labor Hours (SLH) calculator that calculates a total number of hours required to physically manufacture the assembly. Manual inputs 204 or values from a standard database may be provided to the SLH calculator 232 to identify materials and/or other characteristics of parts used to calculate the SLH.

In order to illustrate the different operations that may be performed by the virtual manufacturing tool 224, the following figures may include screenshots of the tool as these different operations are performed. The screenshots illustrate how the virtual manufacturing tool 224 may operate within an active session of the design software 222. By way of example, the following figures use an assembly of a fan cabinet as an example assembly, which may include subassemblies for different doors or cabinet elements, along with individual parts for each subassembly, such as screws, hinges, handles, brackets, and so forth. However, the virtual manufacturing tool 224 will be understood to be compatible with many different types of design software and/or types of assemblies. The virtual manufacturing tool 224 may include the virtual build tool 226, the virtual analysis tool 228, and/or any other tools described herein. In some embodiments, each of these tools may operate as individual applications or plug-ins within the active session of the design software.

Figure 3:
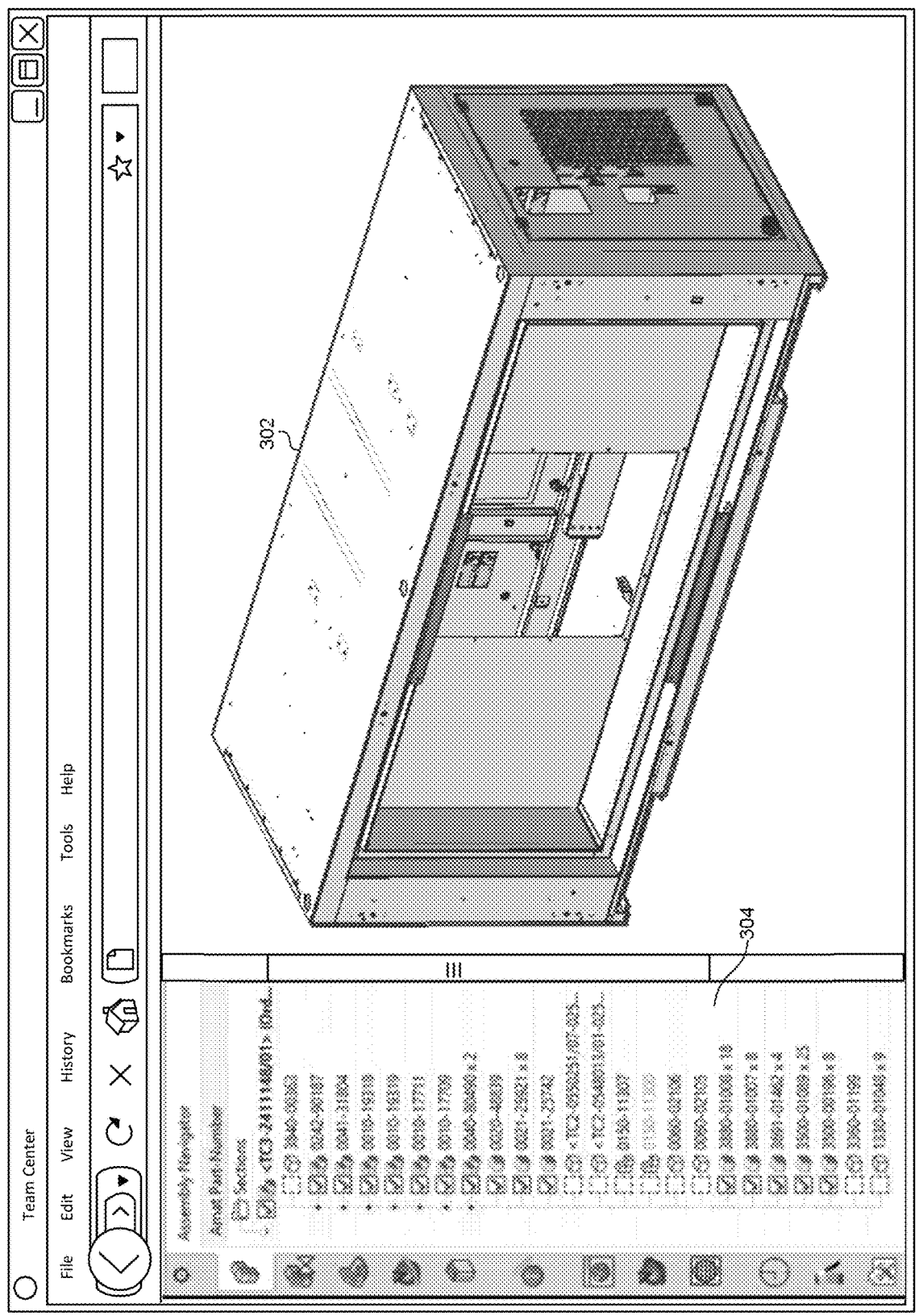
FIG. 3 illustrates an example of design software for designing an assembly, according to some embodiments.

FIG. 3 illustrates an example of design software for designing an assembly, according to some embodiments. The design software may include an image comprising a rendering of a 3D design of assembly 302. The design software may also include a menu 304 that allows the user to navigate the different parts in the assembly 302. The active session of the design software may load the 3D design of the assembly into memory and make the individual 3D elements for each of the subassemblies and/or individual parts available for use or display. As described above, the design software may include CAD software and/or manufacturing lifecycle software.

Figure 4:
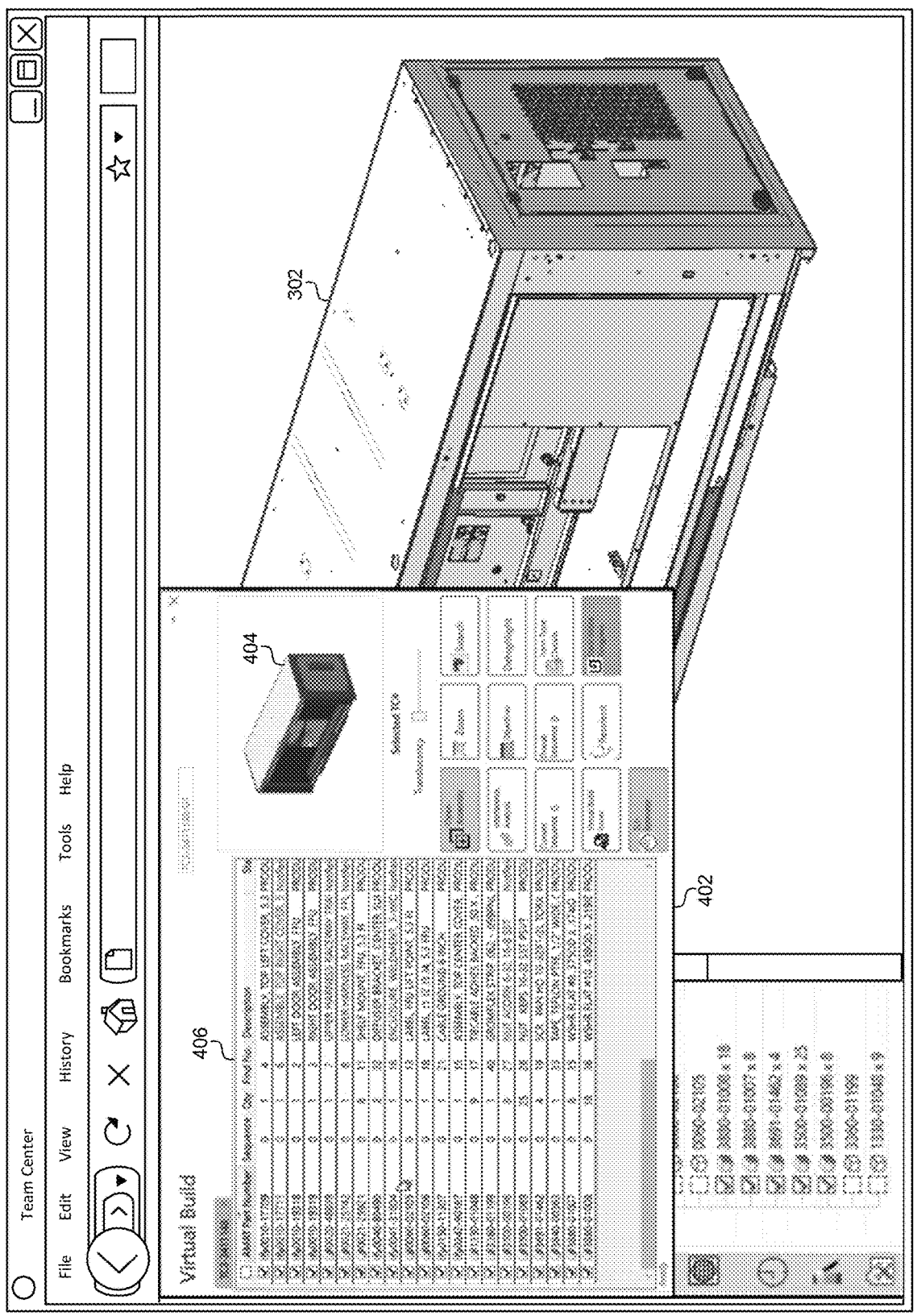
FIG. 4 illustrates how the virtual manufacturing tool may be operated within an active session of the design software, according some embodiments.

FIG. 4 illustrates how the virtual manufacturing tool may be operated within an active session of the design software, according some embodiments. In this example, the virtual build tool 402 has been activated within the design software. This may be activated by way of a menu button or other command executed within the design software. The virtual build tool 402 may operate as an application within the design software, as a part of the design software, as a plug-in to the design software, and/or the like. The virtual build tool may be configured to walk the user through a virtual build of the assembly 302 in order to identify any issues that may arise during the physical manufacture and to generate a BOM and/or virtual build report to be used during the physical manufacture of the assembly.

The virtual build process may be carried out according to multiple levels. For example, as the virtual build tool 402 is initiated, the user may be prompted to provide a review level to be used during the virtual build. A Level 1 virtual build may be performed by an individual new product manufacturing engineer (NPME), a Level 2 virtual build may be performed by the NPME and other manufacturing engineers (MEs) as part of the peer review, and a Level 3 virtual build may be performed by a full new product team, often using more than 10 individuals. Based on the level of build that is selected, the virtual build tool 402 may also accept assignments of various users to be involved in the virtual build review. For example, the virtual build tool 402 may receive user identifiers with associated user roles for each participant in the review process.

The virtual build tool 402 may include a list of subassemblies 406 in the assembly 302. The subassemblies may be loaded from the design software and displayed in the virtual build tool 402. The list of subassemblies 406 may allow individual subassemblies to be selected and "drill down" into further subassemblies or individual parts used in those subassemblies. Additionally, the virtual build tool 402 may include a thumbnail image 404 of the assembly 302. The thumbnail image may be loaded from the design software and rendered using utilities provided by the design software. By selecting individual subassemblies or parts in the list of subassemblies 406, the virtual build tool 402 may change the thumbnail image 404 to display images of the isolated subassembly and/or part instead of the composite image of the full assembly 302. The list of subassemblies 406 may include any or all information describing the individual subassembly or part, such as a description, a part number, a color, a size, a weight, and/or any other characteristic of the subassembly or part.

Figure 5:
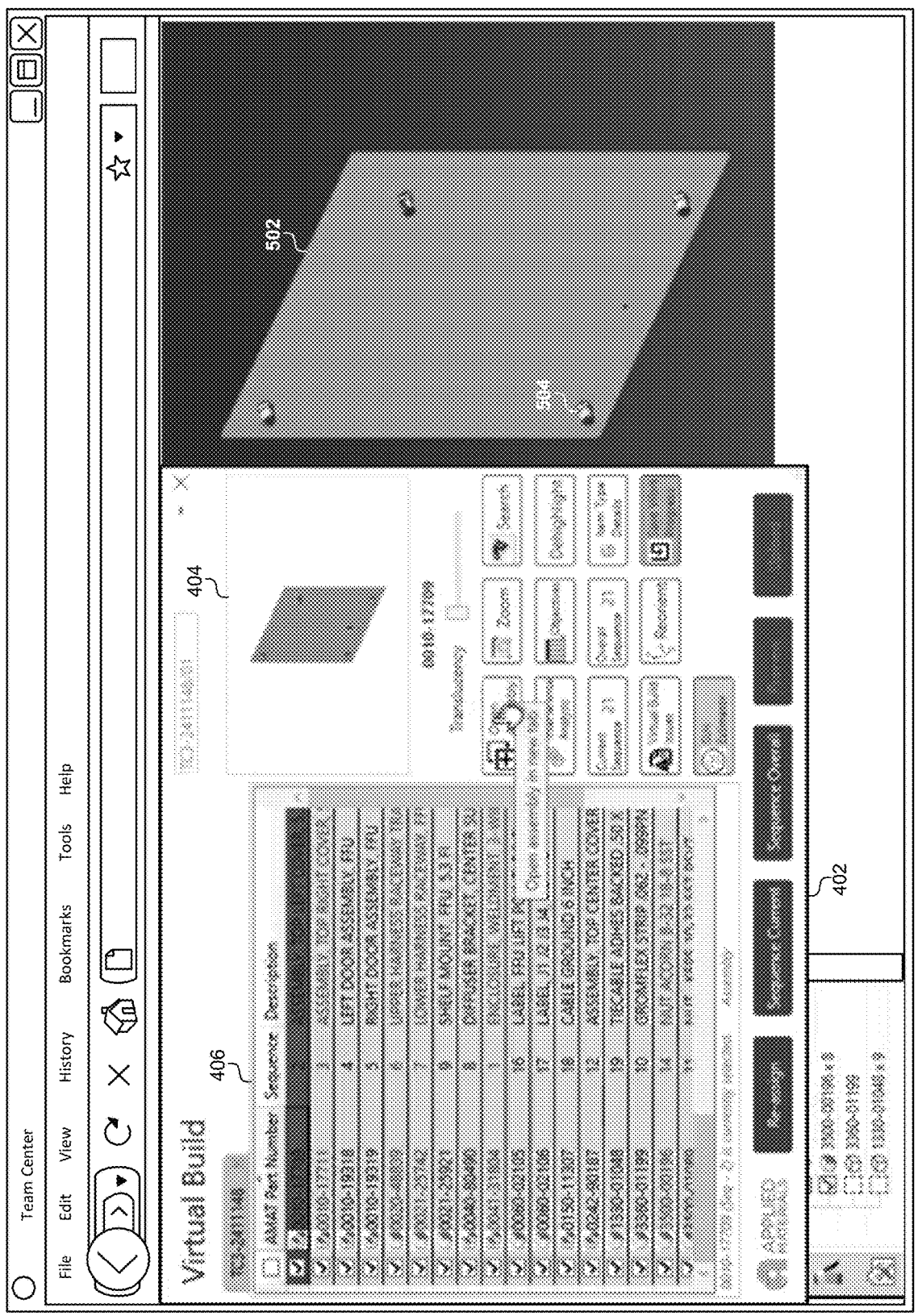
FIG. 5 illustrates an example of how the virtual build tool can be used to specify an assembly sequence, according to some embodiments.

FIG. 5 illustrates an example of how the virtual build tool 402 can be used to specify an assembly sequence, according to some embodiments. One of the characteristics of each of the subassemblies or individual parts is a sequence number in the list of subassemblies 406. Note that the list of subassemblies 406 may include subassemblies and/or individual parts depending on the level at which the assembly is being viewed. For each subassembly, the virtual build tool 402 may display a list of further subassemblies and/or individual parts that are used to manufacture the subassembly. The virtual build tool 402 may allow each individual subassembly and/or individual part to be selected. When a part or subassembly is selected, the thumbnail image 404 may change to display only that subassembly or individual part rather than the entire assembly.

When an individual part or subassembly is selected, the virtual build tool 402 may accept user inputs that edit or augment the characteristics displayed in the list of subassemblies 406. One particular data field that may be populated during this process is the sequence field. The sequence field may indicate a number representing a position in a build sequence for the assembly or subassembly. In the example of FIG. 5, the top left cover of the assembly has been selected, and the corresponding thumbnail image 504 has been changed to display the top left cover rather than the entire assembly. Additionally, the virtual build tool 402 has accepted a sequence value of 2, indicating that the top left cover is the second item to be assembled in a build sequence for the assembly. The virtual build tool 402 allows a sequence number to be input for each subassembly or individual part for the assembly. This sequence number may be used to generate a virtual build report as described below.

In some embodiments, the data displayed in the list of subassemblies 406 may be saved separately as a spreadsheet or other data structure comprising fields corresponding to each data input. Therefore, the list of subassemblies 406 may be saved and viewed outside of the design software and the virtual build tool 402. Edits made to the spreadsheet outside of the virtual build tool 402 may be saved and loaded into the virtual build tool 402 during the current software session or a later software session.

The list of subassemblies 406 in FIG. 5 lists individual parts or subassemblies that are one level below the top-level assembly. However, each individual subassembly listed in the list of subassemblies 406 may be selected to display a list of subassemblies and/or individual parts at a lower level. To complete the sequence for each level of the assembly, individual subassemblies may be selected, and the next level down may populate the list of subassemblies 406. A thumbnail image of that subassembly may then populate the thumbnail image 404 instead of the top-level assembly. The thumbnail images for each level of subassemblies and individual parts may be loaded from the current session of the design software.

Although not shown explicitly in FIG. 5, the list of subassemblies 406 may also include information that may be used during the physical manufacturing of the assembly. For example, the virtual build tool 402 may accept indications of specific user skills required to manufacture the assembly/subassembly, specific safety requirements that should be enforced during manufacture of the assembly/subassembly (e.g., Poke Yoke requirements), or specific equipment that may be required during the assembly process.

This process described for FIG. 5 allows a design engineer to specify requirements and instructions for the physical manufacture of an assembly or subassembly using the virtual build tool 402. In effect, this allows the design engineer to walk through the build process incrementally in a virtual environment, choosing the order and instructions for assembling each part of the overall assembly. Incidental to walking through this process virtually, the virtual build tool 402 gathers the instructions and sequence information needed to automatically generate assembly instructions based on the defined sequence of events and BOM received as inputs during the virtual build process. This solves the technical problem of generating and testing a sequence of events during assembly before physical manufacture takes place.

For example, a thumbnail image may be generated and saved for each sequence step in the virtual build. The user may manipulate the thumbnail image 404 for each subassembly or individual part to create a view that is beneficial during the assembly process. When adding parts to a subassembly, the user may generate cutaway images, exploded images, zoomed images, images with rotated perspectives, and/or other visual manipulations of the thumbnail image 404 to illustrate how a subassembly should be assembled. For example, when the connectors 504 are placed on the left cover 502, the thumbnail image may be created to illustrate those connectors 504 being attached (e.g. screwed into) the left cover 502. This thumbnail image may be saved with the individual part as part of the build sequence. Thus, as the user performs a virtual assembly or build of the subassembly, thumbnail images of the process may be saved of each incremental step and later used to generate instructions used during the physical manufacture of the assembly.

The virtual build process may also allow for the input of specific part numbers as each individual part is selected. Although not shown explicitly in FIG. 5, selecting the part number location in the list may cause a web browser or other utility to launch from the virtual build tool 402. For example, an internal search tool may be launched that allows the user to search for available part numbers that are currently available at the user's organization. In another example, a web browser may be launched and directed to a website of part vendors from which available parts may be selected. In some embodiments, selection of a part number may automatically update the BOM for the assembly stored in the design software. Some embodiments may also provide an option in the web browser to automatically submit a request to procure the part when it is selected as part of the assembly. For example, if a particular part number is selected, the virtual build tool may determine a number of parts required for a predetermined number of assemblies to be built and automatically generate a request for that number of parts to be procured.

Figure 6:
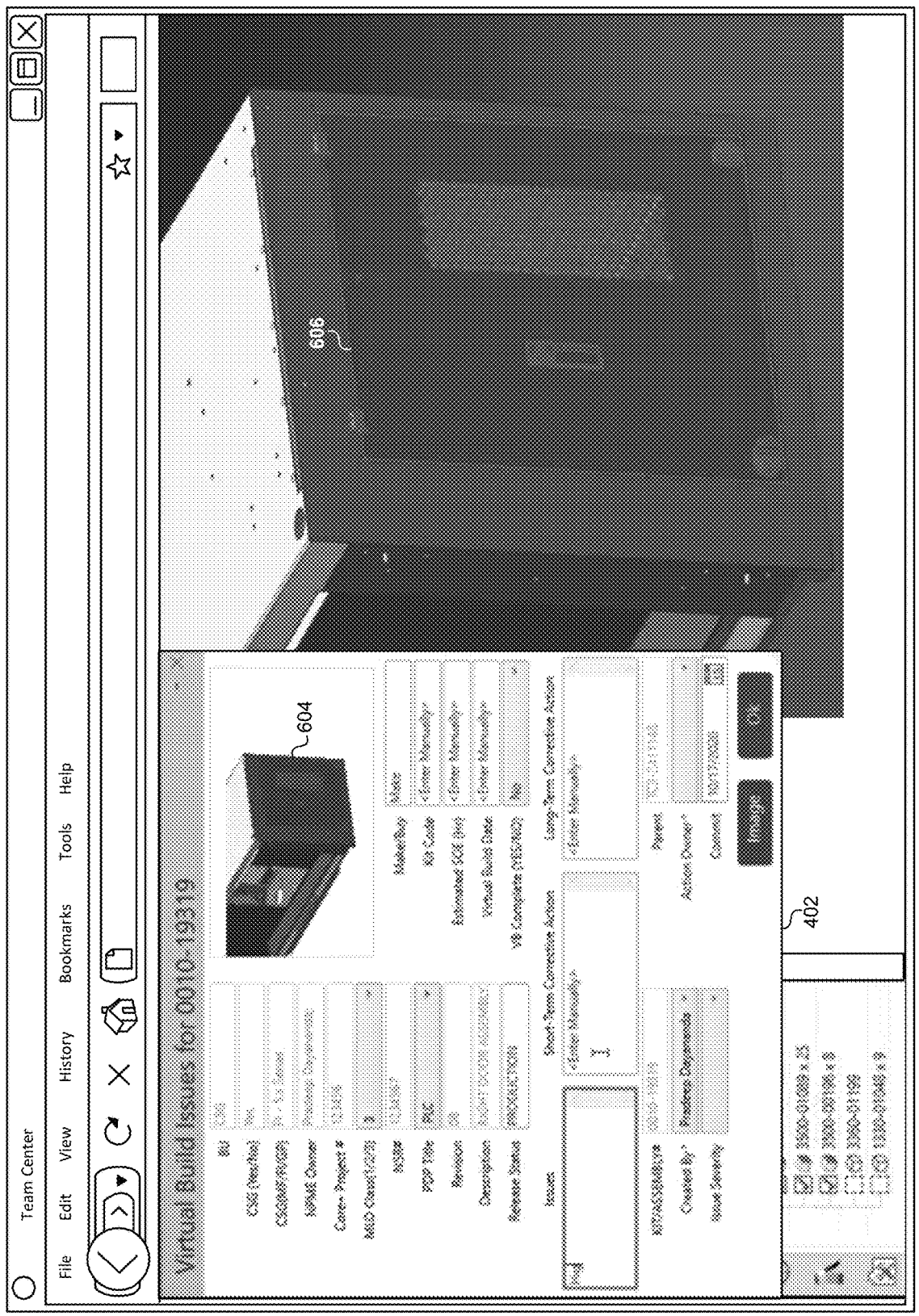
FIG. 6 illustrates how the virtual build tool can be used to identify build issues during the virtual manufacturing process, according to some embodiments.

FIG. 6 illustrates how the virtual build tool can be used to identify build issues during the virtual manufacturing process, according to some embodiments. As the user performs the virtual build operation described above, certain issues may be identified as possibly problematic during the physical build procedure. Issues may include any problem that may arise, including safety issues, design issues, assembly issues, form and fit issues, functionality issues, and so forth. In one example, an issue may include a screw that protrudes too far outside of an assembly, thereby causing a safety issue. In another example, an issue may include a door that opens the wrong direction on a cabinet. In another example, an issue may include a sequence problem where installation of one part may complicate installation of a subsequent part in the sequence list. In another example, an issue may include specific part numbers that may not be appropriate for the design due to safety, qualification, reliability, or other issues. In short, an issue may include any problem that is detected during the virtual build that would be problematic during the later physical manufacture or use of the assembly.

In order to identify, record, and remedy these issues, the virtual build tool 402 may include an interface analysis that allows inputs to be received that define various issues. An issue may be linked to a specific part or subassembly from the list of subassemblies described above in FIGS. 4-5. For example, the part may be selected and a menu option for defining an issue for that part may generate the user interface illustrated in FIG. 6. A number of fields in the user interface may be automatically populated using information from the design of the assembly imported from the design software. For example, part owners, revisions, descriptions, etc., may be imported from the design of the assembly itself. Other information may be added manually. For example, a description of the issue, a short-term corrective action, and/or a long-term corrective action may be entered into the user interface and stored as part of the definition of the issue. The issue may allow an action owner to be defined such that they are alerted when the issue is saved.

Turning back briefly to FIG. 2, an issue report 244 that is defined may be sent to an issues dashboard 254. The issues dashboard 254 may be part of an issue management system and/or part of the design software 222. The issues dashboard 254 may receive issues from other sources 252, and the issues may be stored in an issue database 256. Thus, the virtual build tool 226 may provide issues 244 as inputs to the issues dashboard 254 to integrate with the existing issue management system. Issues identified by the virtual build tool 226 may be stored and handled like any other issue in the issue database 256. For example, issues that were previously recognized during the physical manufacture of the assembly would have been one of the issues received from other sources 252, such as a workstation from a manufacturing engineer during assembly. However, using the virtual build tool 226, the same issue may be identified during the virtual build process and reported to the issues dashboard 254 as an issue report 244.

A technical improvement made to this issue reporting system includes the ability to use thumbnail images from the design software as part of the issue report. Note that the user interface in the virtual build tool 402 includes a thumbnail image 604 of the subassembly selected as part of the issue. In some embodiments, the subassembly may be colored differently, colored red, and/or otherwise visually highlighted to indicate the location on the assembly of the issue. The design software may allow the thumbnail image 604 to be rotated, zoomed, cut away, exploded, or otherwise manipulated to highlight the issue visually. The thumbnail image 604 may be stored with the issue when it is reported by the virtual build tool 402. For example, the virtual build tool 402 may receive inputs that rotate, scale, or color the image 606 displayed in a view window of the design software (e.g., the image 606 may be rotated to show the side door, the side door may be colored red, the side door may be opened or rotated to highlight the issue, etc.). When the image 606 clearly shows the build issue, and input may be received that replaces the thumbnail image 604 with the current image displayed in the design software.

Figure 7:
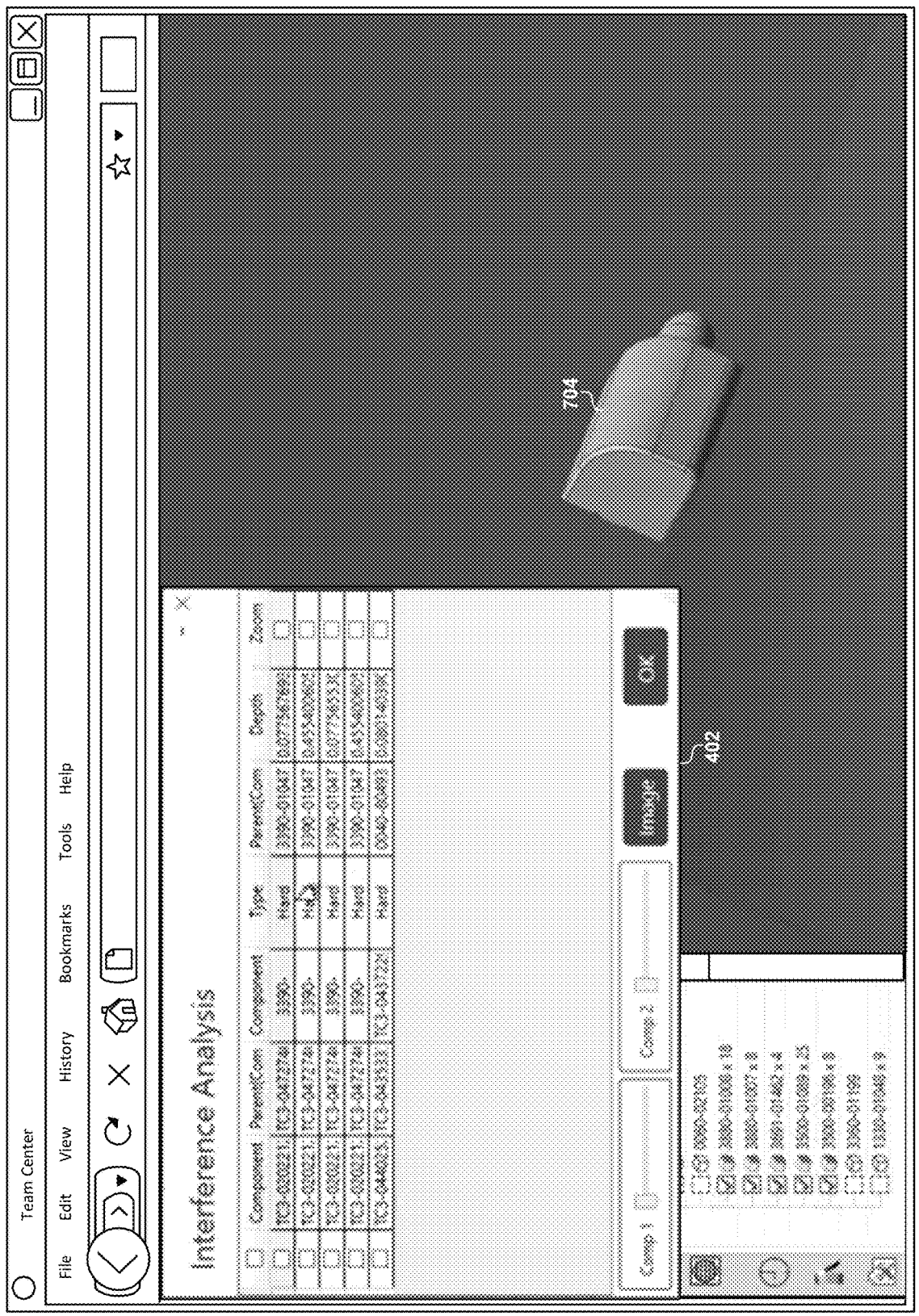
FIG. 7 illustrates how the virtual build tool may perform an interference analysis on selected parts or subassemblies, according to some embodiments.

FIG. 7 illustrates how the virtual build tool 402 may perform an interference analysis on selected parts or subassemblies, according to some embodiments. The virtual build tool 402 may include a user interface that allows for the selection of multiple individual parts and/or subassemblies. In the example of FIG. 7, a checkbox may be used in the left column to select individual parts or subassemblies from the list displayed from the current assembly or subassembly. For example, there may be concern about how certain parts fit together during the virtual build process. Those parts alone may be selected to perform an interference analysis.

The interference analysis may determine whether there is any overlap in the 3D volumes of the selected subassemblies and/or individual parts. In contrast to how this operation may be performed in the design software itself, the virtual build tool allows these parts to be selected within the tool and the interference analysis to be performed on the selected parts or subassemblies. In some embodiments, the selected parts or subassemblies may be provided to the design software, such that the design software can perform the interference analysis. For example, the design software may compare the locations of the three-dimensional volumes of each of the selected parts or subassemblies to determine whether there is any spatial overlap in the virtual space.

If an interference is detected, the virtual build tool may allow an image to be selected that highlights the interference. For example, some embodiments may present a thumbnail image or full image of each of the parts identified as part of the interference. These parts may be displayed in isolation such that they are clearly visible without other parts of the assembly. In some embodiments, visual effects may be used to highlight the interference or make it more readily apparent. For example, some embodiments may change the translucence of the parts involved in the interference such that the interior of these volumes are visible to the user. In some embodiments, the overlapping volume may be color-filled, shaded red, or marked with other highlighted colors to clearly indicate the overlapping 3D volume.

Because the interference analysis is performed as part of the virtual build tool 402, the utilities described above for the virtual build tool 402 may be used to address the interference. For example, the interference may be reported as an issue as described above in relation to FIG. 6. The thumbnail image that highlights the overlapping volume of the interference may be used as the thumbnail image in the issue report. That issue may be assigned to one or more of the parts selected for the interference analysis. In another example, the interference may be reported as part of the virtual build report, and the thumbnail image may be added to the virtual build report and/or to a separate interference report.

Figure 8:
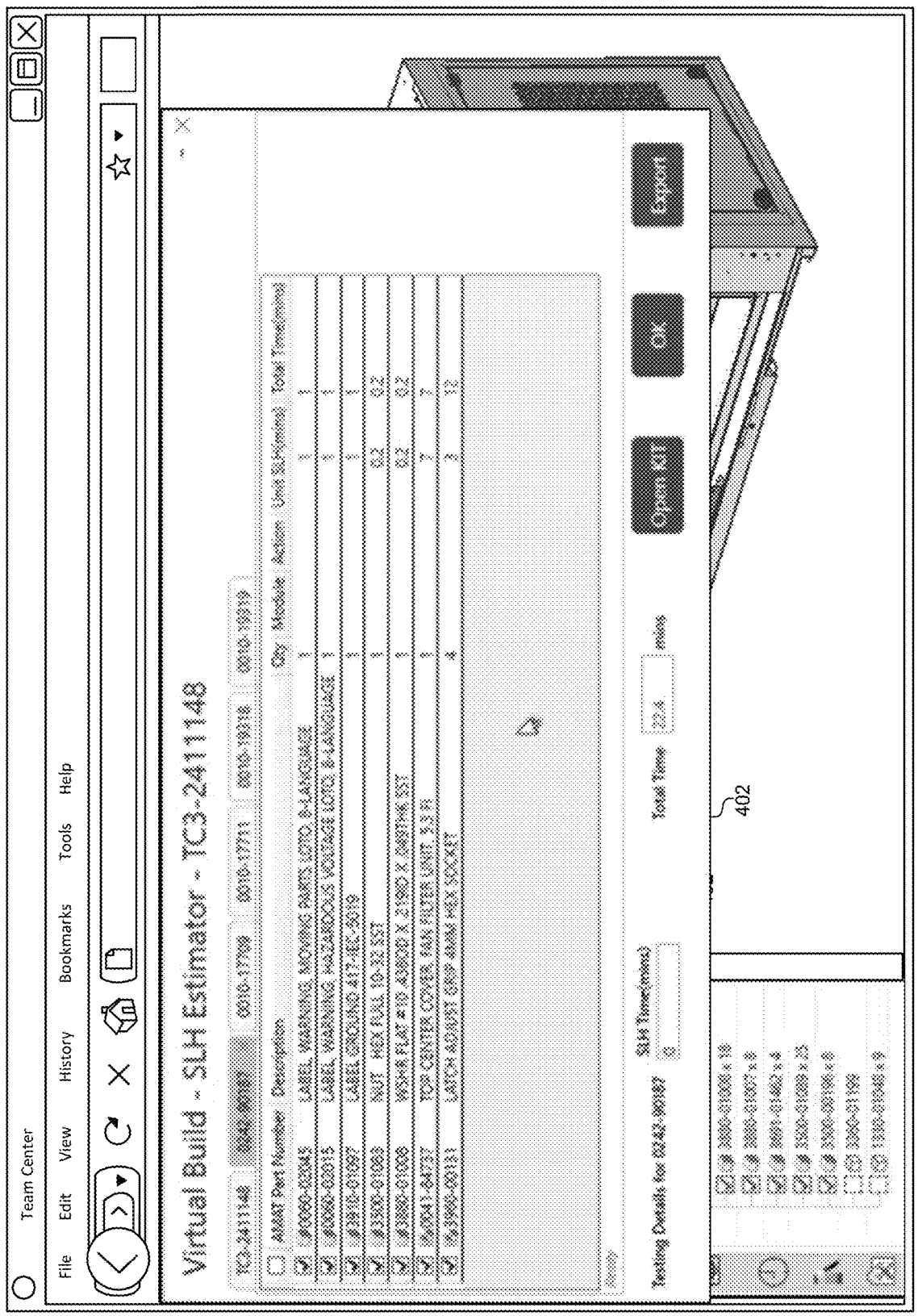
FIG. 8 illustrates how the virtual build tool may be used to perform an Standard Labor Hours (SLH) estimation, according to some embodiments.

FIG. 8 illustrates how the virtual build tool may be used to perform an SLH estimation, according to some embodiments. The user interface illustrated in FIG. 8 may show each of the subassemblies and/or individual parts for an assembly or subassembly. A quantity for the part or subassembly may be defined as one of the columns, along with a total time or other unit used to measure SLH. These units, such as minutes, may be provided as manual inputs. In some embodiments, the virtual build tool 402 may submit a query to a database that stores known or previous SLH values and for each individual part or subassembly. These database values may then be used to populate the user interface for the virtual build tool 402. Any values imported from the database may be updated or otherwise edited by manual inputs.

The SLH estimator may generate a total SLH value for each subassembly or individual part. This value may be calculated by multiplying the quantity for each part by the corresponding SLH estimate. A total SLH value may then be calculated by aggregating the individual SLH estimates for each subassembly or part. The total SLH may then be recorded for the overall subassembly or assembly by aggregating all of the lower levels of subassemblies and individual parts. Some embodiments may also allow a manual entry for a testing time used for the assembly or subassembly. For example, after assembling a cover on a cabinet as a subassembly, two minutes may be allocated as part of the SLH to test the door subassembly.

In some embodiments, an SLH value may be used to generate a standalone report. In other embodiments, the SLH values may be integrated as part of the virtual build report and presented in the instructions provided for performing the physical manufacture of the assembly. For example, each step in the sequence in the virtual build report may indicate an SLH estimate for that step.

Figure 9A:
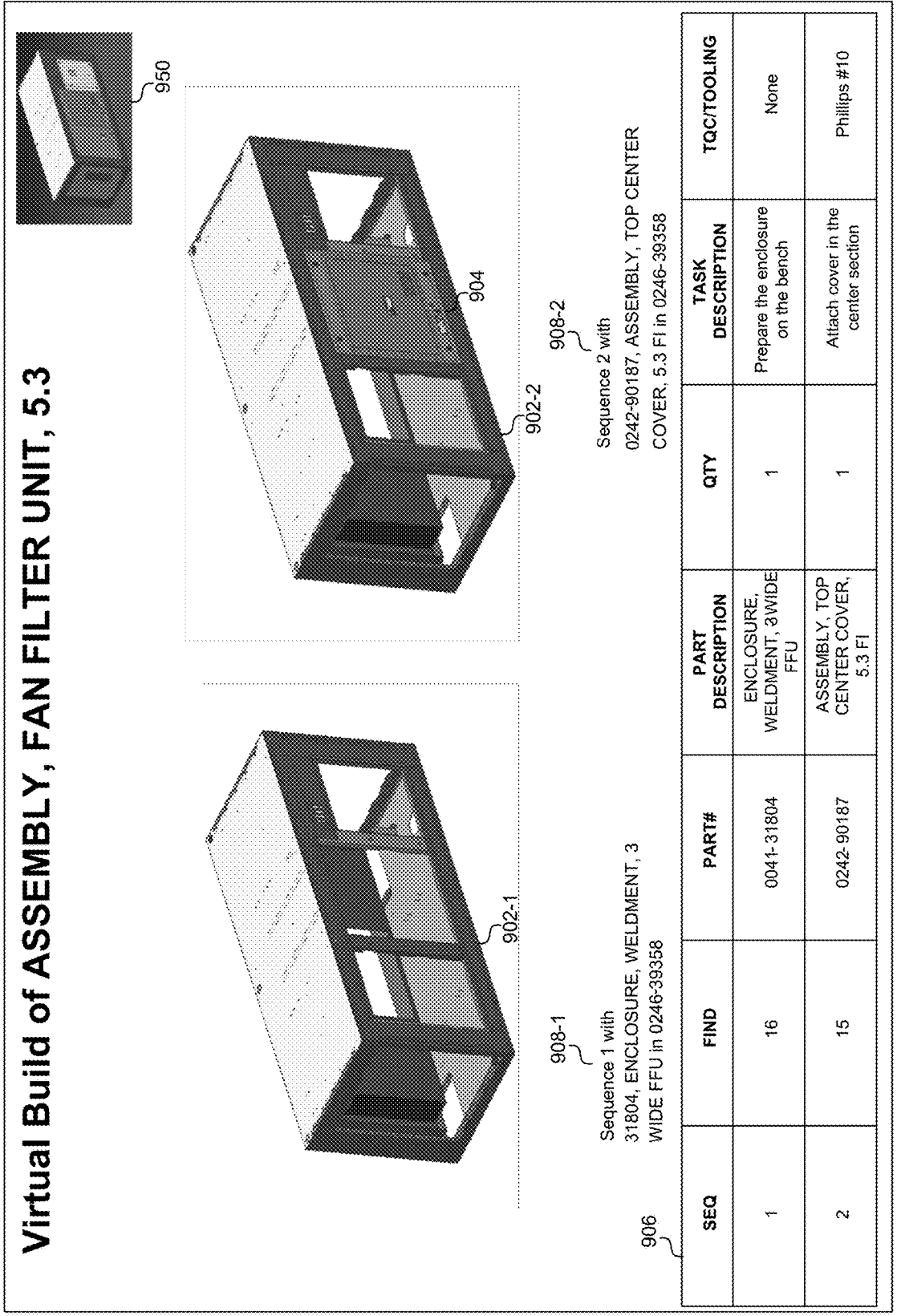
FIGS. 9A-9B illustrate portions of a virtual build report generated by the virtual build tool, according to some embodiments.
Figure 9B:
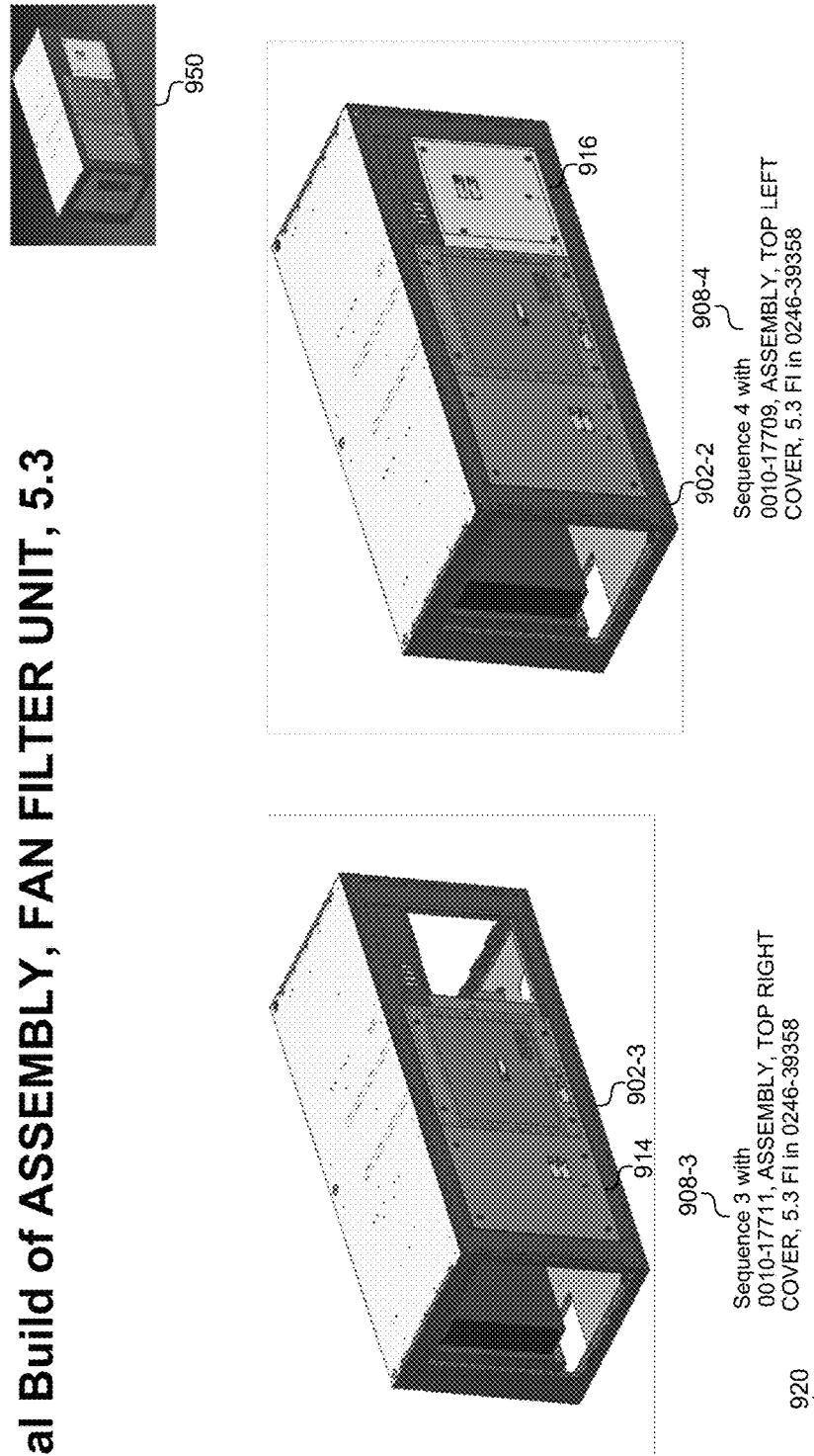

FIGS. 9A-9B illustrate portions of a virtual build report generated by the virtual build tool, according to some embodiments. As described above, the virtual build tool allows users to execute a virtual build of the assembly before the assembly is physically manufactured. The virtual build procedure may include generating and saving thumbnail images of each individual step, as well as generating sequence numbers that can be assigned to each individual part or subassembly in the assembly. After the virtual build process is complete and sequence numbers and thumbnails have been assigned to each of the individual parts and subassemblies, a virtual build report can be generated that compiles the steps of the virtual build into a document that can be followed during a corresponding physical manufacture of the assembly.

FIG. 9A illustrates a first sequence step 908-1 that starts with the enclosure for the cabinet. A thumbnail 902-1 is displayed showing the part labeled as number 1 in the sequence. For reference, pages in the virtual build report may also illustrate a thumbnail 950 of the full assembly. Next, the virtual build report may illustrate a second sequence step 908-2 that adds the top center cover to the assembly. A thumbnail 902-2 may illustrate the cover 904 added to the assembly. This provides visual thumbnails that were selected earlier during the virtual build for each sequence step in the manufacturing process. Additionally, a table 906 may illustrate additional characteristics of each subassembly or individual part that is added with each successive sequence step. This information may include the sequence step, a part number, a part description, a quantity, descriptions of the assembly process, and any tooling or skills required for the corresponding sequence step.

Similarly, FIG. 9B illustrates a third sequence step 908-3 that adds the top right cover to the assembly. A corresponding thumbnail 902-3 includes the image of the top right cover 914 added to the composite image of the assembly as a visual guide. A fourth sequence step 908-4 may add a top left cover to the assembly, and a corresponding thumbnail 902-4 includes the image of the top left cover 916 added to the composite image of the assembly as a visual guide. A table 920 may again include sequence steps, part numbers, descriptions, quantities, task descriptions, and any special tooling or skills required for the manufacturing steps.

Although not shown explicitly in FIGS. 9A-9B, the virtual build report may include a BOM that includes part numbers, descriptions, sequence numbers, quantities, statuses, units, materials, weights, criticality ratings, and/or other characteristics of each individual part or subassembly used in the overall assembly. The virtual build report may also indicate a level for the virtual build and/or any user identifiers assigned to participate. In some embodiments, the virtual build report may be divided into subsections according to subassemblies, with each subassembly being manufactured separately, and each having their own set of sequence numbers.

As described above, the virtual build tool may perform an interference analysis. One of the outputs of the virtual build tool may include a report that includes interferences with interference details that identify the components involved, the type of interference, the penetration depth of one part into the volume of another part as a result of the interference, and so forth. Some embodiments may also include the thumbnail images saved as part of the interference analysis that illustrates how parts interfere with each other.

Some embodiments may also allow the virtual build tool to generate an SLH report that comprises a tab for each subassembly in the overall assembly. Each subassembly may list individual parts along with the SLH estimates based on quantities of each individual part. Overall SLH estimates may be included for each subassembly, along with an overall SLH estimate for the assembly as a whole.

Figure 10:
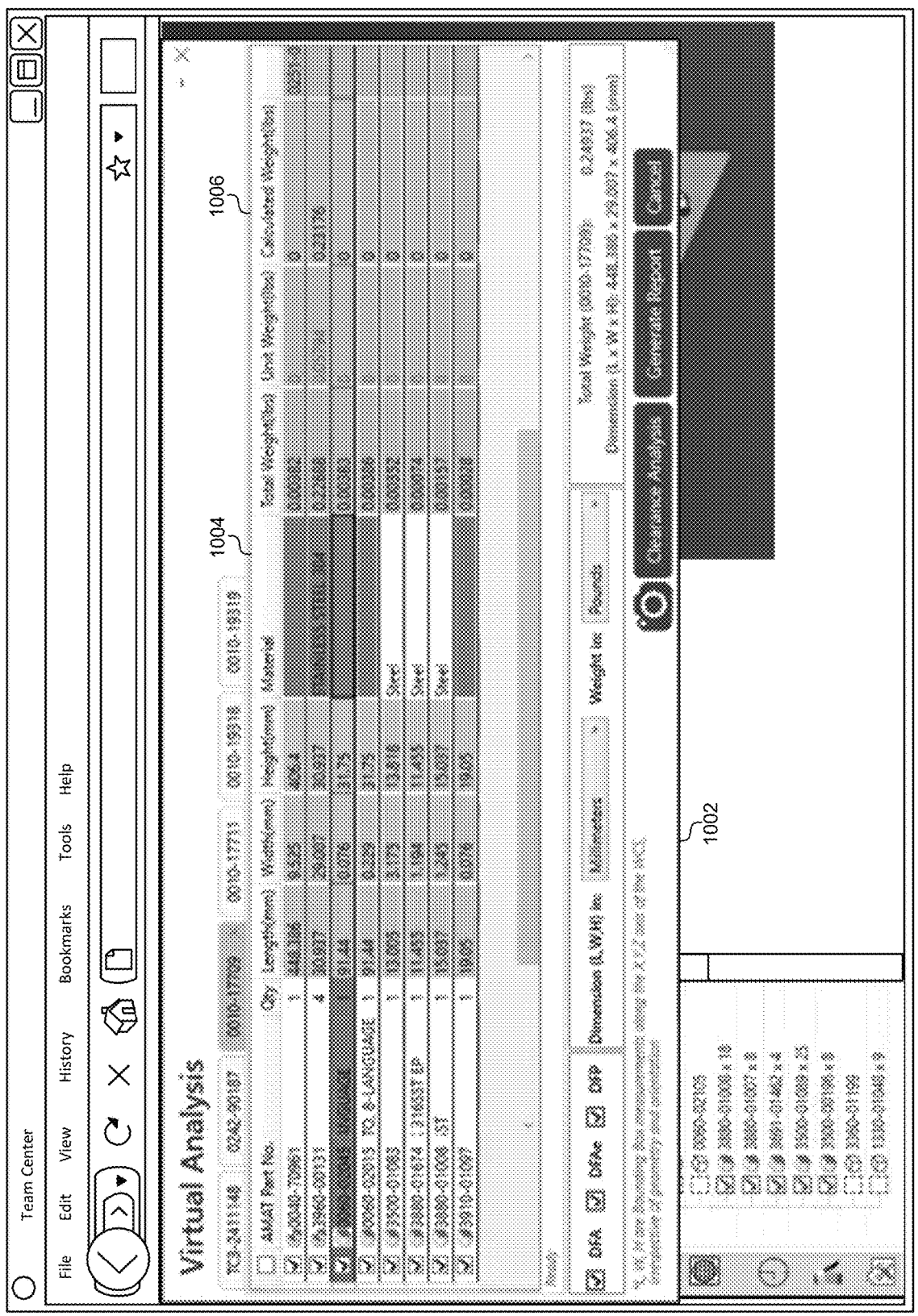
FIG. 10 illustrates a virtual analysis tool, according to some embodiments.

FIG. 10 illustrates a virtual analysis tool 1002, according to some embodiments. The virtual analysis tool 1002 may operate as part of the virtual manufacturing process, yet may be a different tool than the virtual build tool described above. The virtual analysis tool 1002 may also operate inside an active session of the design software as an application, feature, plug-in, and so forth, as described above for the virtual build tool. Like the virtual build tool, the virtual analysis tool 1002 may extract individual parts and subassemblies from the design software. The information extracted with each individual part or subassembly may include a 3D representation, dimensions, materials, colors, and/or other characteristics assigned during the design process.

The virtual analysis tool 1002 may generate a user interface that includes tabs for each of the subassemblies in the overall assembly. Within each tab, the individual parts or subassemblies for each subassembly may be displayed, along with their quantity, width, height, material choice, weight, and other physical characteristics of the individual part. One purpose of the virtual analysis tool 1002 is to perform a virtual analysis of the physical characteristics of the assembly to determine whether any special tooling or procedures may be needed during the physical manufacturing process.

For example, the virtual analysis tool 1002 may allow users to provide a material choice 1004 for each selected part. When a part is selected, the column for the material choice 1004 may provide a drop-down menu of available materials for that particular part. For example, a cover may include material choices such as stainless steel, aluminum, plastic, Plexiglas, and so forth. Material selections may be imported from a database that includes impossible materials available for each part number.

After selecting the material for a part, the total weight may be calculated based on the material chosen. For example, choosing stainless steel for the cover may result in a significantly greater weight than choosing plastic for the cover. This process may be carried out for each individual part in the subassembly. Total dimensions (length, height, width) may be combined from each of the individual parts to generate total dimensions for the subassembly as a whole. Additionally, the calculated weight for each individual part may be aggregated to generate a total weight for each subassembly.

The total weight and/or total dimensions of each subassembly may be compared to thresholds that determine whether any special tooling may be required for the manufacturing process. For example, for subassembly weights that exceed a threshold, the virtual analysis tool 1002 may specify that a specific table or support structure should be used during the manufacturing process. For weights and/or dimensions above a certain threshold, the virtual analysis tool 1002 may specify that multiple users may be required to handle and/or move the subassembly during the manufacturing process. The virtual analysis tool may provide a report that includes thumbnail images from the design software that shows individual parts or subassemblies that require special tooling or skills.

Additionally, some embodiments may cause the virtual analysis tool 1002 to provide a clearance analysis. The clearance analysis may be similar to the interference analysis described above. For example, the clearance analysis may be executed on selected parts across multiple subassembly tabs in the virtual analysis tool 1002. The clearance analysis may detect subassemblies and individual parts that have overlapping physical volumes and generate a report with corresponding thumbnail images illustrating these overlapping volumes.

Figure 11:
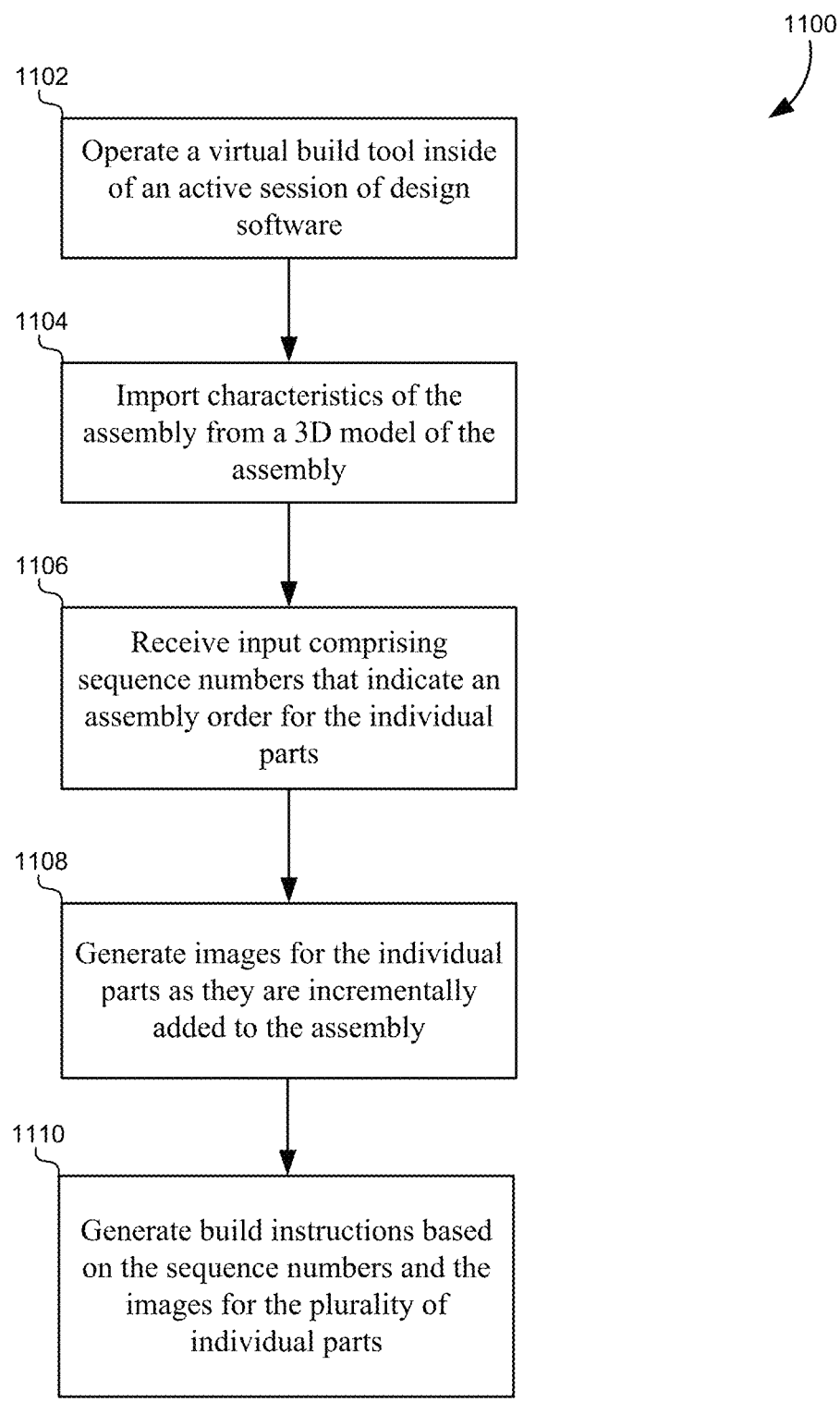
FIG. 11 illustrates a flowchart of a method for performing a virtual build of an assembly and/or generating a virtual build report, according to some embodiments.

FIG. 11 illustrates a flowchart 1100 of a method for performing a virtual build of an assembly and/or generating a virtual build report, according to some embodiments. The method may include operating a virtual build tool inside of an active session of design software (1102). As described above, the design software may include CAD software or lifecycle management software that maintains a 3D model of the assembly. Therefore, the design software may be configured to design the assembly, maintain the assembly, edit the assembly, and combine individual parts to form a virtual representation of the assembly. The assembly itself may include a plurality of individual parts. The assembly itself may also include one or more subassemblies, and each subassembly may include further subassemblies and/or individual parts.

The method may also include importing characteristics of the assembly from a 3D model of the assembly that is maintained by the design software (1104). The characteristics of the assembly may be imported from the design software into the virtual build tool during, and as part of, the active session of the design software. Importing the characteristics of the assembly may cause the virtual build tool to perform the actions described above, such as setting a level for the virtual build, receiving or assigning user identifiers to participate in the virtual build, and so forth. The number of user identifiers participating in the virtual build may be determined based on the level of the virtual build. The characteristics of the assembly may include individual 3D models of the individual parts. The characteristics may also include part numbers, physical dimensions, quantities, weights, descriptions, colors, materials, and/or other characteristics of the individual parts.

The method may further include receiving input that includes sequence numbers indicating an assembly order for the plurality of individual parts (1106). For example, the virtual build tool may display a table listing individual parts in the assembly. As described above, in FIGS. 4-5, a listing of individual parts may allow for selection of an individual part. Once selected, the rendered view of that individual part may be displayed in the virtual build tool and the sequence number may be assigned.

The method may additionally include generating images for the plurality of individual parts as they are incrementally added to the assembly based on the sequence number (1108). For example, thumbnail images may be rendered or imported from the design software for a current part being added to the virtual build. A composite image comprising images of each of the previous parts in the assembly sequence may be displayed in the virtual build tool. An image or thumbnail image may be generated that shows the image of the current part being added to the composite image to illustrate how the current individual part is added to the assembly when physically manufacturing the assembly.

The method may also include generating a set of build instructions based on the sequence numbers and the images of the individual parts (1110). The set of build instructions may illustrate how to physically manufacture the assembly. As described above in FIGS. 9A-9B, the build instruction may include the images of the individual parts ordered according to sequence numbers to illustrate how each part is added to the assembly. In some embodiments, the virtual build tool may also perform an interference analysis. This may include receiving a selection of a subset of the plurality of individual parts as described above in FIG. 7, in determining whether the volumes of these parts include overlapping volumes. A list of interferences between these volumes may also be generated as an interference report that may be included in the set up build instructions and/or generated separately. The set of build instructions may be part of the virtual build report described above, along with any other reports described in this disclosure. Additionally, any of the other operations described throughout this disclosure may be performed by the virtual build tool or by the virtual analysis tool.

It should be appreciated that the specific steps illustrated in FIG. 11 provide particular methods of performing a virtual build of an assembly according to various embodiments. Other sequences of steps may also be performed according to alternative embodiments. For example, alternative embodiments may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 12:
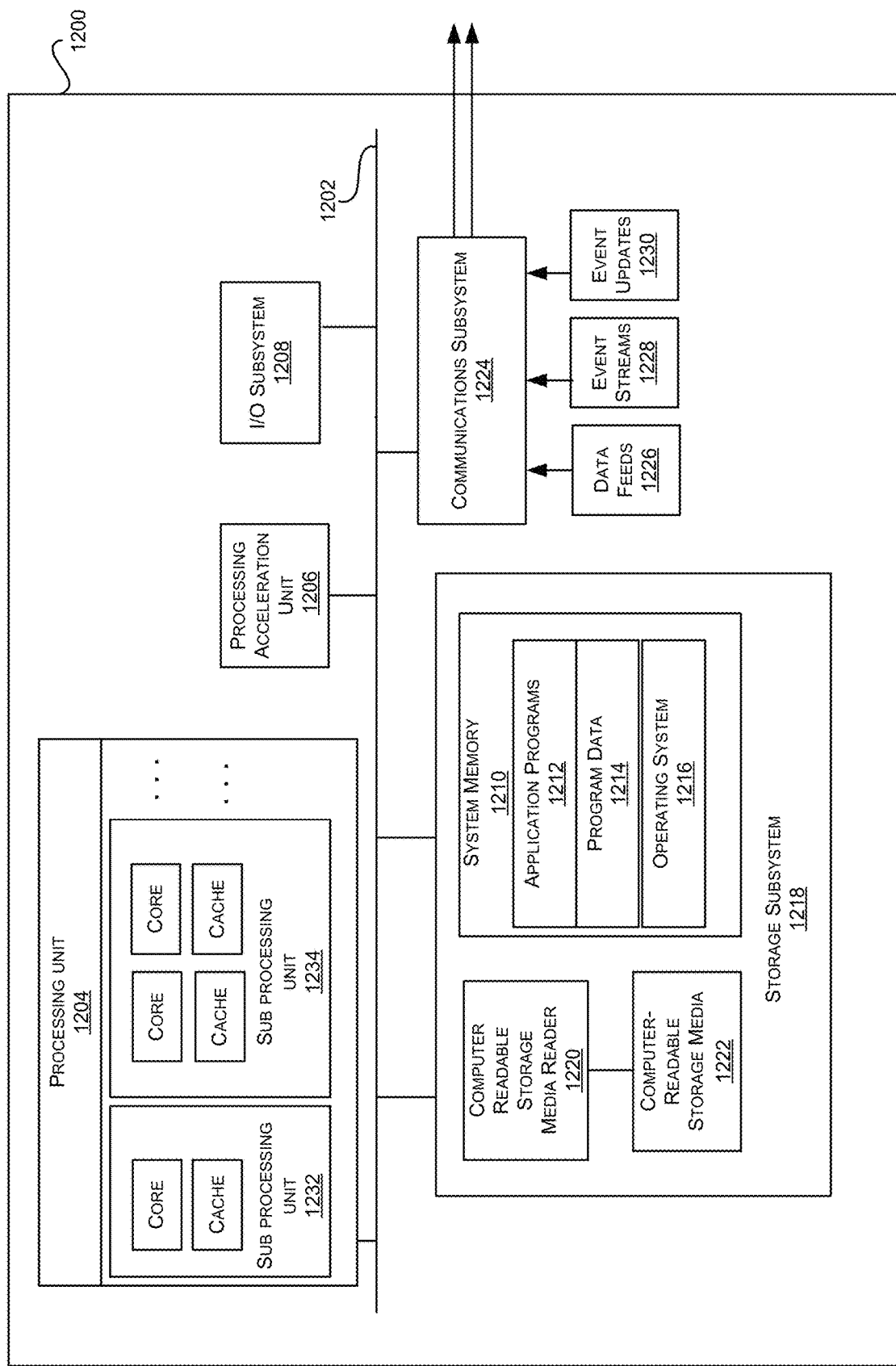
FIG. 12 illustrates an exemplary computer system, in which various embodiments may be implemented.

FIG. 12 illustrates an exemplary computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with some embodiments.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of performing a virtual build of an assembly, the method comprising:
    operating a virtual build tool that runs as a plug-in or application inside of an active session of a design software, wherein the virtual build tool is configured to perform a virtual build of the assembly, the design software is configured to design a three-dimensional (3D) model of an assembly, and the assembly is comprised of a plurality of individual parts;
    importing, from the design software into the virtual build tool, characteristics of the assembly from a three-dimensional (3D) model of the assembly that is maintained by the design software;
    receiving, by the virtual build tool, input comprising sequence numbers that indicate an assembly order for the plurality of individual parts;
    generating, by the virtual build tool, images for the plurality of individual parts as they are incrementally added to the assembly based on the sequence numbers, wherein the images are generated in a window of the design software and imported into the virtual build tool within the active session of the design software;
    receiving a selection of a subset of the plurality of individual parts;
    determining whether volumes of the subset of the plurality of individual parts include overlapping volumes;
    generating a list of interferences between the volumes of the subset of the plurality of individual parts; and
    generating a set of build instructions based on the sequence numbers and the images for the plurality of individual parts, wherein the set of build instructions illustrate how to physically manufacture the assembly.

2. The method of claim 1, wherein the virtual build tool displays a table listing the plurality of individual parts in the assembly, and selecting an individual part in the plurality of individual parts generates a rendered view of the individual part in the virtual build tool from the 3D model in the design software.

3. The method of claim 1, wherein the assembly is further comprised of one or more subassemblies.

4. The method of claim 1, wherein importing the characteristics of the assembly causes the virtual build tool to receive a plurality of user identifiers associated with the virtual build of the assembly, wherein a number of the user identifiers is determined based on a selected level of the virtual build.

5. The method of claim 1, wherein the characteristics of the assembly include 3D models of the plurality of individual parts, part numbers for the plurality of individual parts, physical dimensions of the plurality of individual parts, and quantities for the plurality of individual parts.

6. The method of claim 1, wherein generating the images for the plurality of individual parts as they are incrementally added to the assembly comprises:
adding an image of a current individual part to a composite image comprising images of previous parts in an assembly sequence; and
receiving one or more commands that cause the image of the current individual part to be placed into the composite image to illustrate how the current individual part is added to the assembly when physically manufacturing the assembly.

7. A non-transitory computer-readable medium comprising instructions that, when executed by one or more processors, cause the one or more processors to perform operations comprising:
operating a virtual build tool that runs as a plug-in or application inside of an active session of a design software, wherein the virtual build tool is configured to perform a virtual build of the assembly, the design software is configured to design a three-dimensional (3D) model of an assembly, and the assembly is comprised of a plurality of individual parts;
importing, from the design software into the virtual build tool, characteristics of the assembly from a three-dimensional (3D) model of the assembly that is maintained by the design software;
receiving, by the virtual build tool, input comprising sequence numbers that indicate an assembly order for the plurality of individual parts;
generating, by the virtual build tool, images for the plurality of individual parts as they are incrementally added to the assembly based on the sequence numbers, wherein the images are generated in a window of the design software and imported into the virtual build tool within the active session of the design software;
receiving a selection of a subset of the plurality of individual parts;
determining whether volumes of the subset of the plurality of individual parts include overlapping volumes;
generating a list of interferences between the volumes of the subset of the plurality of individual parts; and
generating a set of build instructions based on the sequence numbers and the images for the plurality of individual parts, wherein the set of build instructions illustrate how to physically manufacture the assembly.

8. The non-transitory computer-readable medium of claim 7, wherein the virtual build tool displays a table listing the plurality of individual parts in the assembly, and selecting an individual part in the plurality of individual parts generates a rendered view of the individual part in the virtual build tool from the 3D model in the design software.

9. The non-transitory computer-readable medium of claim 7, wherein the assembly is further comprised of one or more subassemblies.

10. The non-transitory computer-readable medium of claim 7, wherein importing the characteristics of the assembly causes the virtual build tool to receive a plurality of user identifiers associated with the virtual build of the assembly, wherein a number of the user identifiers is determined based on a selected level of the virtual build.

11. The non-transitory computer-readable medium of claim 7, wherein the characteristics of the assembly comprise 3D models of the plurality of individual parts, part numbers for the plurality of individual parts, physical dimensions of the plurality of individual parts, and quantities for the plurality of individual parts.

12. The non-transitory computer-readable medium of claim 7, wherein generating the images for the plurality of individual parts as they are incrementally added to the assembly comprises:
adding an image of a current individual part to a composite image comprising images of previous parts in an assembly sequence; and
receiving one or more commands that cause the image of the current individual part to be placed into the composite image to illustrate how the current individual part is added to the assembly when physically manufacturing the assembly.

13. A system comprising:
one or more processors; and
one or more memory devices comprising instructions that, when executed by the one or more processors, cause the one or more processors to perform operations comprising:
operating a virtual build tool that runs as a plug-in or application inside of an active session of a design software, wherein the virtual build tool is configured to perform a virtual build of the assembly, the design software is configured to design a three-dimensional (3D) model of an assembly, and the assembly is comprised of a plurality of individual parts;
importing, from the design software into the virtual build tool, characteristics of the assembly from a three-dimensional (3D) model of the assembly that is maintained by the design software;
receiving, by the virtual build tool, input comprising sequence numbers that indicate an assembly order for the plurality of individual parts;
generating, by the virtual build tool, images for the plurality of individual parts as they are incrementally added to the assembly based on the sequence numbers, wherein the images are generated in a window of the design software and imported into the virtual build tool within the active session of the design software;
receiving a selection of a subset of the plurality of individual parts;
determining whether volumes of the subset of the plurality of individual parts include overlapping volumes;
generating a list of interferences between the volumes of the subset of the plurality of individual parts; and
generating a set of build instructions based on the sequence numbers and the images for the plurality of individual parts, wherein the set of build instructions illustrate how to physically manufacture the assembly.

14. The system of claim 13, wherein the virtual build tool displays a table listing the plurality of individual parts in the assembly, and selecting an individual part in the plurality of individual parts generates a rendered view of the individual part in the virtual build tool from the 3D model in the design software.

15. The system of claim 13, wherein importing the characteristics of the assembly causes the virtual build tool to receive a plurality of user identifiers associated with the virtual build of the assembly, wherein a number of the user identifiers is determined based on a selected level of the virtual build.

16. The system of claim 13, wherein the characteristics of the assembly comprise 3D models of the plurality of individual parts, part numbers for the plurality of individual parts, physical dimensions of the plurality of individual parts, and quantities for the plurality of individual parts.

17. The system of claim 13, wherein generating the images for the plurality of individual parts as they are incrementally added to the assembly comprises:
   adding an image of a current individual part to a composite image comprising images of previous parts in an assembly sequence; and
   receiving one or more commands that cause the image of the current individual part to be placed into the composite image to illustrate how the current individual part is added to the assembly when physically manufacturing the assembly.

* * * * *